(12) United States Patent
Kim et al.

(10) Patent No.: US 10,691,245 B2
(45) Date of Patent: Jun. 23, 2020

(54) TOUCH SENSOR

(71) Applicant: Samsung Display Co., Ltd., Yongin-si (KR)

(72) Inventors: Min Soo Kim, Yongin-si (KR); Mu Gyeom Kim, Yongin-si (KR); Won Ki Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 16 days.

(21) Appl. No.: 15/629,413

(22) Filed: Jun. 21, 2017

(65) Prior Publication Data

US 2017/0371471 A1    Dec. 28, 2017

(30) Foreign Application Priority Data

Jun. 22, 2016 (KR) .................. 10-2016-0078249
Oct. 21, 2016 (KR) .................. 10-2016-0137602

(51) Int. Cl.
```
G06F 3/041      (2006.01)
G06F 3/044      (2006.01)
G02F 1/1343     (2006.01)
G02F 1/1333     (2006.01)
```
(52) U.S. Cl.
CPC .......... *G06F 3/0414* (2013.01); *G02F 1/1343* (2013.01); *G02F 1/13338* (2013.01); *G06F 3/044* (2013.01); *G02F 2201/122* (2013.01); *G06F 2203/04105* (2013.01); *G06F 2203/04111* (2013.01)

(58) Field of Classification Search
CPC combination set(s) only.
See application file for complete search history.

(56) References Cited

U.S. PATENT DOCUMENTS

| | | | |
|---|---|---|---|
| 6,703,132 B1* | 3/2004 | Yasuda | ............... B81C 1/00896 324/244 |
| 8,780,074 B2 | 7/2014 | Castillo et al. | |
| 9,246,486 B2 | 1/2016 | Yang et al. | |
| 9,417,141 B2 | 8/2016 | Aberg et al. | |

(Continued)

FOREIGN PATENT DOCUMENTS

| | | |
|---|---|---|
| KR | 10-2011-0040453 | 4/2011 |
| KR | 10-1679622 | 12/2016 |

(Continued)

OTHER PUBLICATIONS

Non-Final Office Action dated Feb. 27, 2019 in related U.S. Appl. No. 15/710,342.

(Continued)

*Primary Examiner* — Van N Chow
(74) *Attorney, Agent, or Firm* — H.C. Park & Associates, PLC

(57) ABSTRACT

A touch sensor includes: a plurality of electrodes; and a plurality of sensing wires connected with the respective electrodes, and formed by extending in a first direction, wherein at least one of the electrodes includes a resistance element which has a shape that is at least partially bent in a unit electrode region and has a resistance value that is changed to correspond to a pressure of a touch. A touch location and pressure can be sensed with the same elements, so that the touch sensor may have increased function yet remain thin.

10 Claims, 15 Drawing Sheets

(56) References Cited

U.S. PATENT DOCUMENTS

| | | | |
|---|---|---|---|
| 2013/0009905 A1* | 1/2013 | Castillo | G06F 3/044 345/174 |
| 2015/0153951 A1 | 6/2015 | Kim et al. | |
| 2015/0185476 A1 | 7/2015 | Lee | |
| 2015/0193064 A1 | 7/2015 | Lu et al. | |
| 2015/0220119 A1 | 8/2015 | Seo et al. | |
| 2016/0351631 A1 | 12/2016 | Lee | |
| 2017/0220162 A1* | 8/2017 | Ko | G06F 3/0412 |
| 2017/0277296 A1 | 9/2017 | Reynolds et al. | |
| 2017/0371471 A1 | 12/2017 | Kim et al. | |
| 2018/0088629 A1 | 3/2018 | Kim | |
| 2018/0088716 A1 | 3/2018 | Kim | |
| 2018/0356925 A1 | 12/2018 | Liu et al. | |

FOREIGN PATENT DOCUMENTS

| | | |
|---|---|---|
| KR | 10-2017-0091213 | 8/2017 |
| KR | 10-2018-0000665 | 1/2018 |
| KR | 10-2018-0033355 | 4/2018 |

OTHER PUBLICATIONS

Final Office Action dated Jan. 28, 2020, in U.S. Appl. No. 15/710,342.

\* cited by examiner

TOUCH SENSOR

CROSS-REFERENCE TO RELATED APPLICATIONS

This application claims priority from and the benefit of Korean Patent Application No. 10-2016-0078249 filed on Jun. 22, 2016, and Korean Patent Application No. 10-2016-0137602 filed on Oct. 21, 2016, which is hereby incorporated by reference for all purposes as if fully set forth herein.

BACKGROUND

Field

Exemplary embodiments relate to a touch sensor.

Discussion of the Background

As interest in information displays have increased and demands for use of portable information media have increased, research and commercialization of display devices have increased as well.

Recent display devices have a video display function and include a touch sensor for receiving a user's touch. Accordingly, a user may use the display device more conveniently through the touch sensor.

Recently, various functions have been provided to the user by using a pressure generated from a touch, as well as a touch position.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensor for detecting a pressure of a touch.

Exemplary embodiments also provide a touch sensor for detecting a touched point and a touch pressure.

Exemplary embodiments also reduce a thickness of a touch sensor for detecting a touched point and a touch pressure.

Additional aspects will be set forth in the detailed description which follows, and, in part, will be apparent from the disclosure, or may be learned by practice of the inventive concept.

According to exemplary embodiments, a touch sensor includes: a plurality of electrodes; and a plurality of sensing wires connected with the respective electrodes, and formed by extending in a first direction, wherein at least one of the electrodes includes a resistance element which has a shape that is at least partially bent in a unit electrode region and has a resistance value that is changed to correspond to a pressure of a touch.

The resistance element may have a shape that is spirally wound.

A portion of the resistance element may have a zigzag shape.

The resistance element may operate as strain gauge.

A pressure of the touch may be detected from the changed resistance value of the resistance element, and a position of the touch may be detected from the capacitance change of the electrodes corresponding to the touch.

The electrodes may sense a touch in a self-capacitance manner.

The touch sensor may further include a plurality of driving electrodes configured to form mutual-capacitance together with the electrodes, and the electrodes may include a first sub-electrode having a polygonal shape; and a second sub-electrode connected with the first sub-electrode and having the resistance element.

The first sub-electrode may be disposed closer to the driving electrode than the second sub-electrode.

The second sub-electrode may be disposed between the first sub-electrode and the sensing wires.

An exemplary embodiment of the present invention provides a touch sensor including: a plurality of electrodes; and a plurality of sensing wires connected with the respective electrodes, and formed by extending in a first direction, wherein at least one of the electrodes includes a first resistance element that has a zigzag pattern and has a resistance value that is changed to correspond to a pressure of a touch.

The first resistance element may operate as strain gauge.

A pressure of the touch may be detected from the changed resistance value of the first resistance element, and a position of the touch may be detected from the capacitance change amount of the electrodes changed to correspond to the touch.

The electrodes may sense a touch in a self-capacitance manner.

At least one of the electrodes may include a second resistance element which has a shape that is at least partially bent in a unit electrode region and has a resistance value that is changed to correspond to the pressure of the touch.

The second resistance element operates as strain gauge, and may sense a pressure of the touch from the changed resistance value of the second resistance element.

The first resistance element included in the sensing wire having a longer length among the plurality of sensing wires may have a longer length.

Resistance elements connected to the electrodes disposed on a same vertical line may be sequentially arranged along the first direction.

An exemplary embodiment of the present invention provides a touch sensor including: a plurality of first electrodes arranged in a first direction; a plurality of second electrodes arranged in a second direction that is perpendicular to the first direction, to form mutual-capacitance together with an adjacent first electrodes; a plurality of first connectors configured to connect the first electrodes; and a plurality of second connectors configured to connect the second electrodes, wherein at least one of the electrodes and the connectors includes a resistance element having a zigzag pattern A pressure of the touch may be sensed from the changed resistance value of the resistance element.

The resistance element may be included in at least one of the first connectors and the second connectors.

Each of the first and second electrodes may include a first sub-electrode having a polygonal shape; and a second sub-electrode connected with the first sub-electrode and having the resistance element.

One side of a first sub-electrode of the first electrode may face one side of first sub-electrodes of second electrodes adjacent to the first electrode.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
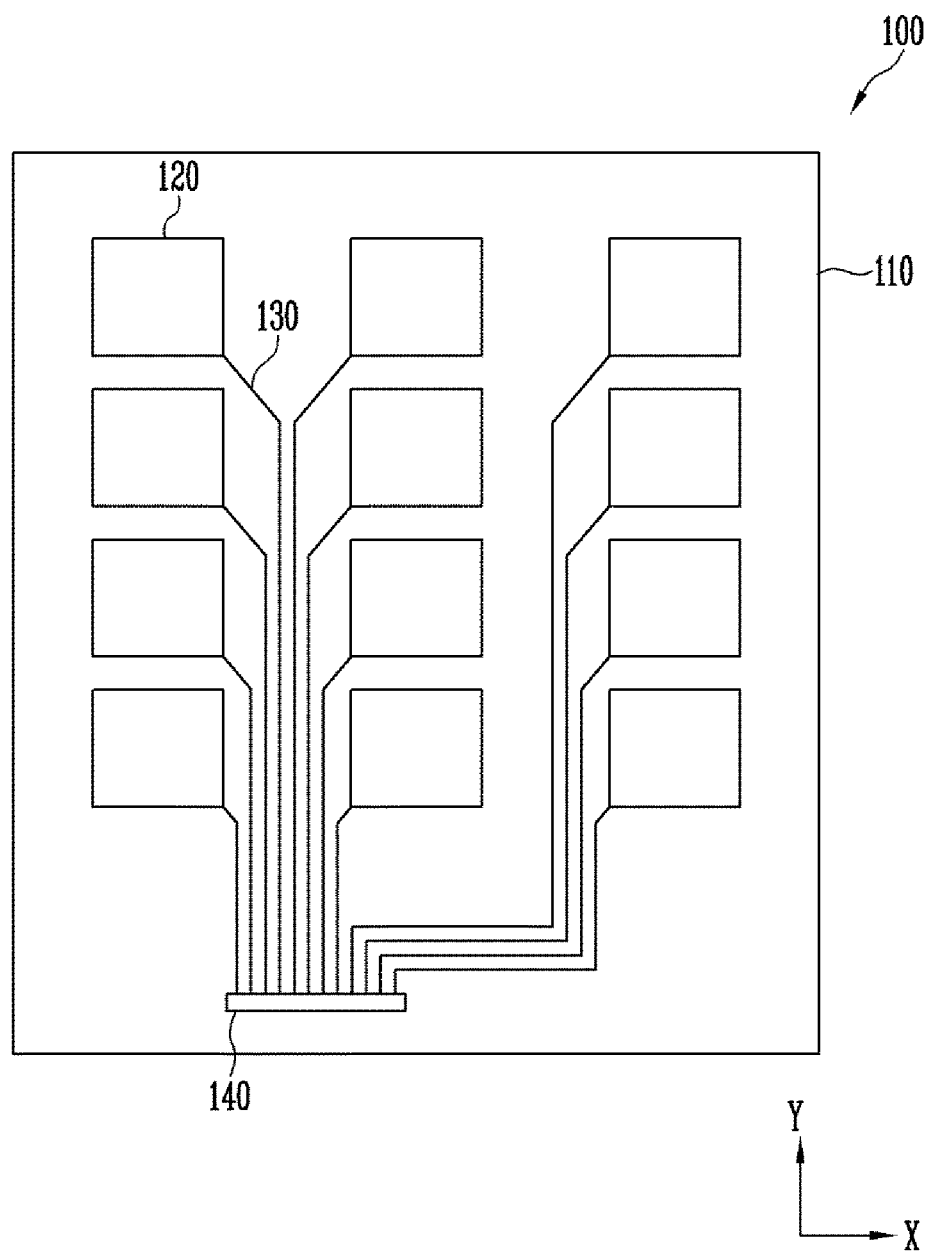
FIG. 1 illustrates a touch sensor according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Advantages and features of the present invention and methods for achieving them will be made clear from exemplary embodiments described below in detail with reference to the accompanying drawings. However, the present invention is not limited to exemplary embodiments described herein and will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Further, the drawings and description are to be regarded as illustrative in nature and not restrictive. Like reference numerals designate like elements throughout the specification.

FIG. 1 illustrates a touch sensor according to an exemplary embodiment of the present invention.

Referring to FIG. 1, a touch sensor 100 according to the exemplary embodiment of the present invention includes a substrate 110, a plurality of electrodes 120, a plurality of sensing wires 130, and a sensor controller 140.

First, the substrate 110 may be made of an insulating material such as glass, resin, or the like. The substrate 110 may be made of a flexible material so as to be bent or folded, and may have a single-layer structure or a multi-layer structure.

For example, the substrate 110 may include at least one of polystyrene, polyvinyl alcohol, polymethyl methacrylate, polyether sulfone, polyacrylate, polyetherimide, polyethylene naphthalate, polyethylene terephthalate, polyphenylene sulfide, polyarylate, polyimide, polycarbonate, triacetate cellulose, and cellulose acetate propinonate.

However, a material constituting the substrate 110 may be variously changed, and may be made of a glass fiber reinforced plastic (FRP) or the like.

Next, the electrodes 120 may be disposed on the substrate 110.

Specifically, a shape in which the electrodes 120 are disposed may be a matrix form in which the electrodes 120 are disposed in a first direction (X-axis direction), and a plurality of rows of the electrodes arranged in the first direction (X-axis direction) are arranged in a second direction (Y-axis direction).

According to the exemplary embodiment of the present invention, the electrodes 120 may sense touches inputted into the touch sensor 100 by using capacitance variation, and may also sense self-capacitance.

The electrodes 120 may include a conductive material. Examples of the conductive material may include a metal, an alloy thereof, a conductive polymer, and a conductive metal oxide.

In the present exemplary embodiment, examples of the metal include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead. Examples of the conductive polymer may include a polythiophene-based compound, a polypyrrole-based compound, a polyaniline-based compound, a polyacetylene-based compound, a polyphenylene-based compound, and a mixture thereof, and particularly, a PEDOT/PSS compound may be employed among polythiophene-based compounds.

Examples of the conductive metal oxide may include ITO (Indium Tin Oxide), IZO (Indium Zinc Oxide), AZO (Antimony Zinc Oxide), ITZO (Indium Tin Zinc Oxide), ZnO (Zinc Oxide), and $SnO_2$ (Tin Oxide).

In the exemplary embodiment of the present invention, the electrodes 120 may be formed of a single layer or multiple layers.

FIG. 1 illustrates that the electrodes 120 may have a quadrangular shape, but the present invention is not limited thereto. For example, the shape of the electrodes 120 may be variously changed.

For better comprehension and ease of description, FIG. 1 illustrates that three electrodes 120 may be arranged in the first direction (X-axis direction), and four electrodes 120 may be arranged in the second direction (Y-axis direction). However, the number of the electrodes 120 included in the touch sensor 100 may be variously adjusted.

A plurality of sensing wires 130 may be connected between the electrodes 120 and the sensor controller 140. Specifically, each of the sensing wires 130 may extend from a corresponding electrode 120 in the second direction (Y-axis direction) to be electrically connected with the sensor controller 140.

The sensing wires 130 may serve to transfer signals outputted from the electrodes 120, to the sensor controller 140. The signals may include signals corresponding to an electrostatic capacitance of electrodes and strains of resistance elements described later In this case, since the sensing wires 130 may be respectively connected to the electrodes 120, the number of the sensing wires 130 may be equal to the number of the electrodes 120 included in the touch sensor 100.

FIG. 1 also illustrates that the electrodes 120 and the sensing wires 130 may be formed in a same layer, but the present invention is limited thereto. For example, the electrodes 120 and the sensing wires 130 may be formed in different layers, and may be electrically connected with each other through a contact hole.

When the touch is inputted into the touch sensor 100, the self-capacitance of the electrodes 120 associated with the touch may change, so that the sensor controller 140 may detect a touch position by using signals outputted from the electrodes 120

In addition, the sensor controller 140 may serve to supply a driving signal to the electrodes 120.

FIG. 1 also illustrates that the electrodes 120 and the sensor controller 140 may be formed in a same layer, but the present invention is limited thereto. For example, the sensor controller 140 may be separately formed, and then may be electrically connected to the substrate 110.

Figure 2:
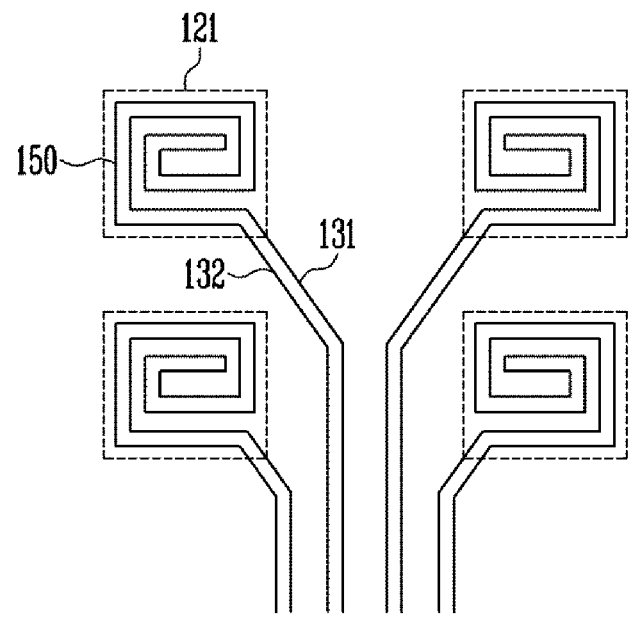
FIG. 2 is an enlarged view of a portion of the touch sensor shown in FIG. 1, illustrating a shape of an electrode according to an exemplary embodiment of the present invention.

FIG. 2 is an enlarged view of a portion of the touch sensor shown in FIG. 1, illustrating a shape of an electrode according to an exemplary embodiment of the present invention. For example, for better comprehension and ease of description, sensing wires connected with four electrodes and the electrodes are illustrated in FIG. 2.

Referring to FIG. 2, an electrode 121 according to the present invention may include a resistance element 150, and the resistance element 150 may have a portion that is bent to have a predetermined pattern in a unit electrode.

As illustrated in FIG. 2, in the case that the resistance element 150 has the portion that is bent to have the predetermined pattern in the unit electrode, when a pressure having a predetermined magnitude is inputted into the touch sensor 100, a length or cross-sectional area of the resistance element 150 included in the electrode 121 is changed (hereinafter, a degree of the change is referred to as strain).

Since the resistance value may change when the length or cross-sectional area of the resistance element 150 changes, the magnitude of the pressure may be determined from the changed resistance value.

For example, according to the present exemplary embodiment, the electrode 121 including the resistive element 150 having a bent shape so as to have a predetermined pattern in the unit electrode region is operated as a strain gauge.

Specifically, when a touch is inputted, the position of the touch may be obtained through the amount of change in a self-capacitance of the electrode 121 related to the touch, and the magnitude of the touch pressure may be obtained from a strain of the resistance element 150.

For example, the sensor control unit 140 may detect the presence or absence of the touch input and the pressure of the touch through the change amount of the voltage. Specifically, when the amount of change in the voltage is equal to or greater than a predetermined threshold value, it may be determined that the touch is inputted, and the pressure of the touch may be determined in proportion to the amount of change in the voltage.

Alternatively, the sensor control unit 140 may determine a position of the touch during a first period, and may determine a pressure of the touch during a second period.

The resistive element 150 may be configured to vary in physical properties (a length, a cross-sectional area, a resistance value, etc.) by pressure and may be in the form of a line, a thin film, etc., such that the electrode 121 may operate as a strain gauge. In addition, the resistive element 150 may include a conductive material such as a metal.

Examples of the metal may include gold (Au), silver (Ag), aluminum (Al), molybdenum (Mo), chromium (Cr), titanium (Ti), nickel (Ni), neodymium (Nd), copper (Cu), platinum (Pt), and the like.

The material constituting the resistance element 150 is not limited to those described above. The resistance element 150 according to the present exemplary embodiment may be a material capable of detecting both a capacitance change and a resistance value change.

According to the present exemplary embodiment, since the electrode 121 may detect both the capacitance change and the resistance value change, the touch point and the pressure of the touch may be compositely grasped. In addition, since a separate pressure sensor is not provided, the thickness of the touch sensor 100 may be reduced.

In the present exemplary embodiment, the resistance element 150 may be spirally wound in a unit electrode region. In this case, the resistance element 150 may be an angled spiral wound shape as shown in FIG. 2, or may be a spiral wound shape of a curve.

The resistance element 150 may be formed separately from the sensing wiring 130 and then electrically connected to the sensing wiring 130, but the present invention is not limited thereto. For example, the resistance element 150 described above may be formed as a part of the sensing wiring 130, and the sensing wiring 130 may extend to the unit electrode area.

Figure 3:
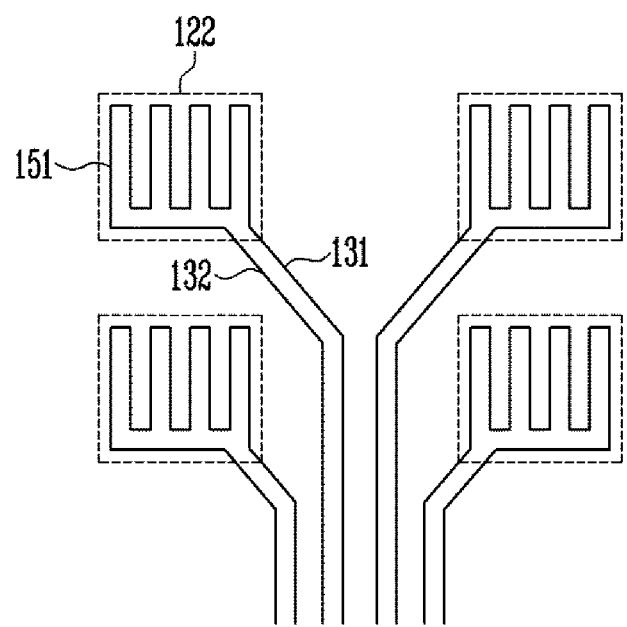
FIG. 3 is an enlarged view of a portion of the touch sensor shown in FIG. 1, illustrating a shape of an electrode according to another exemplary embodiment of the present invention.

FIG. 3 is an enlarged view of a portion of the touch sensor shown in FIG. 1, illustrating a shape of an electrode according to another exemplary embodiment of the present invention. For better comprehension and ease of description, sensing wires connected with four electrodes and the electrodes are illustrated in FIG. 3.

Referring to FIG. 3, a portion of the resistive element 151 of the electrode 122 according to another embodiment of the present invention may be a zigzag pattern.

A straight portion of the resistance element 151 facing the zigzag pattern of the resistance element 151 may be parallel to the first direction (X-axis direction).

The electrode 122 according to another embodiment of the present invention may operate as a strain gauge like the electrode 121 of FIG. 2.

Specifically, when a touch is inputted on the electrode 122, the sensor controller 140 may acquire the position of the touch through the amount of change in the self capacitance of the electrode 122, and may obtain the magnitude of the touch pressure from the strain of the resistance element 151 included in the electrode 122.

The resistance element 151 may be formed of a same material as the resistance element 150 described above.

Each of the sensing wires 130 connected to the electrode 122 may include a first sensing wire 131 and a second sensing wire 132 depending on a shape of the resistance element 151. The first sensing wiring 131 and the second sensing wiring 132 may extend in parallel along the second direction (Y-axis direction).

The first sensing wiring 131 and the second sensing wiring 132 may transmit a signal outputted from the electrode 122 to the sensor control unit 140. In this case, the signal includes a signal corresponding to a self-capacitance and a resistance value of a resistive element.

The resistance element 151 may be formed separately from the sensing wire 131 and 132, and then electrically connected to the sensing wire 131 and 132. However, the present invention is not limited thereto. For example, the resistance element 151 described above may be formed as a part of the sensing wires 131 and 132, and the sensing wires 131 and 132 may extend to the unit electrode area.

Figure 4:
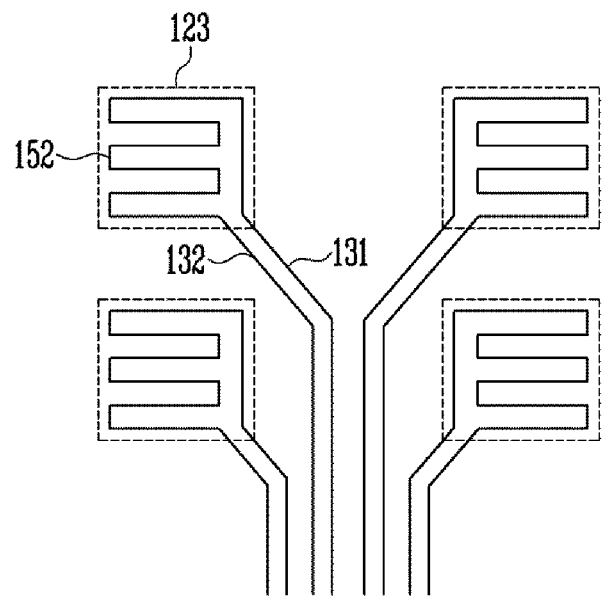
FIG. 4 is an enlarged view of a portion of the touch sensor shown in FIG. 1, illustrating a shape of an electrode according to yet another exemplary embodiment of the present invention.

FIG. 4 is an enlarged view of a portion of the touch sensor shown in FIG. 1, illustrating a shape of an electrode according to yet another exemplary embodiment of the present invention. For better comprehension and ease of description, sensing wires connected with four electrodes and the electrodes are illustrated in FIG. 4.

Referring to FIG. 4, a portion of the resistive element 152 of the electrode 123 according to another embodiment of the present invention may be a zigzag pattern.

A straight portion of the resistance element 152 facing the zigzag pattern of the resistance element 152 may be parallel to the second direction (Y-axis direction).

The electrode 123 according to another embodiment of the present invention may operate as a strain gauge like the electrodes 121 and 122 described above.

Specifically, the position of the touch may be obtained through the amount of change in the capacitance of the electrode 123, and the magnitude of the touch pressure may be obtained from a strain of the resistance element 152 of the electrode 123.

Each of the sensing wires 130 connected with the electrode 123 may include a first sensing wire 131 and the second sensing wire 132, depending on a shape of the resistance element 152. The first sensing wire 131 and the second sensing wire 132 may extend in parallel along the second direction (Y-axis direction).

The first sensing wire 131 and the second sensing wire 132 may transfer signals outputted from the electrode 123 to the sensor controller 140. In this case, the signal may include a signal corresponding to a self-capacitance and a resistance value of the resistance element.

The resistance element 152 may be formed separately from the sensing wires 131 and 132, and then electrically connected to the sensing wires 131 and 132. However, the present invention is not limited thereto. For example, the aforementioned resistance element 152 may be portions of the sensing wire 131 and 132, and may be formed by allowing the sensing wire 131 and 132 to extend to a unit electrode region.

Meanwhile, the electrodes 121, 122, and 123 illustrated in FIG. 2 to FIG. 4 include resistance elements having a predetermined pattern, but the present invention is not limited thereto. For example, some of the electrodes included in the touch sensor 100 may include a resistive element, and the other electrodes may be electrodes capable of sensing changes in capacitance only.

Figure 5:
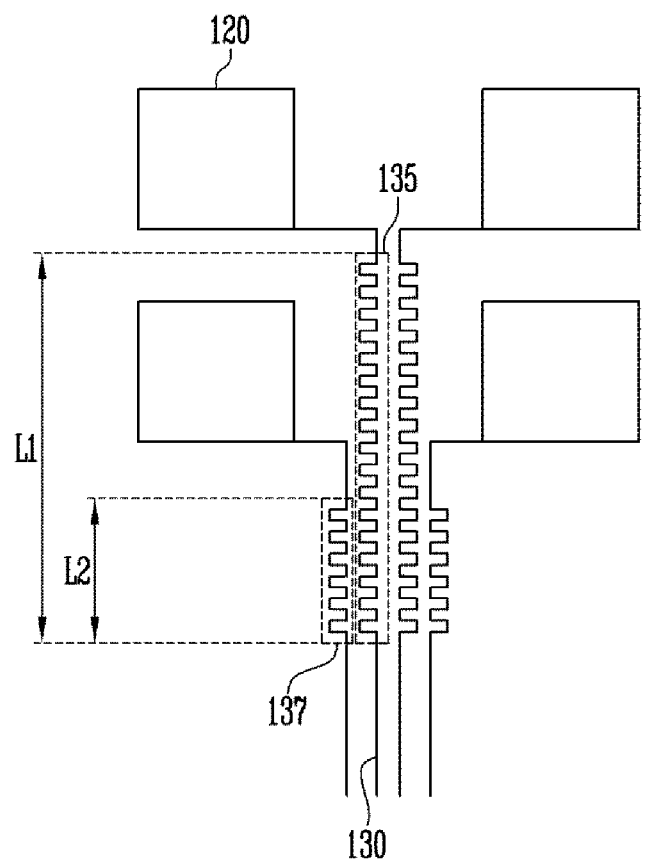
FIG. 5 is an enlarged view of a portion of the touch sensor shown in FIG. 1, illustrating a shape of sensing wires according to an exemplary embodiment of the present invention.

FIG. 5 is an enlarged view of a portion of the touch sensor shown in FIG. 1, illustrating a shape of sensing wires according to an exemplary embodiment of the present invention. For better comprehension and ease of description, sensing wires connected with four electrodes and the electrodes are illustrated in FIG. 5.

Referring to FIG. 5, the sensing wires 130 may be respectively connected to each of the electrodes 120.

The electrodes 120 illustrated in FIG. 5 may be electrodes capable of sensing both a change in capacitance and a change in resistance value. Alternatively, the electrodes 120 may be electrodes capable of sensing only capacitance change. Further some of the electrodes 120 may be electrodes capable of sensing both a change in capacitance and a change in resistance, and the other electrodes may be electrodes capable of sensing a capacitance change only.

The sensing wires 130 according to the present exemplary embodiment may include resistive elements 135 and 137 formed in a zigzag pattern.

When a region where the electrodes 120 are formed is referred to as a touch sensing region, the sensing wires 130 may also be disposed in the touch sensing region That is, when a pressure having a predetermined magnitude is inputted into the touch sensor 100, a length or a cross-sectional area of the resistance elements 135 and 137 may be changed Since the resistance value may change when the length or cross-sectional area of the resistance elements 135 and 137 changes, the magnitude of the pressure may be determined from the changed resistance value.

As a result, according to the present exemplary embodiment, the sensing wires 130 including the resistive elements 135 and 137 of the zigzag pattern may operate as a strain gauge.

Specifically, when a touch is inputted on the touch sensor 100, a position of the touch may be obtained through the amount of change of the self capacitance of the electrodes 120 related to the touch, and a magnitude of the touch pressure may be obtained from a strain of the resistance elements 135 and 137.

The resistive elements 135 and 137 may be formed of a same material as the resistive elements 150, 151 and 152 described above, and it may be possible to form a resistance element according to the present exemplary embodiment when it transfers electric signals outputted from the electrodes 120 and operates as a strain gauge.

According to the present exemplary embodiment, it may be possible to compositely grasp a touched point and a magnitude of the touch. In addition, it may be possible to reduce a thickness of the touch sensor 100 by allowing some of the sensing wires 130 which are necessarily provided to transmit the signals outputted from the electrodes 120, to serve as a strain gauge.

Referring to FIG. 1 and FIG. 5, the sensing wires 130 connect the electrodes 120 with the sensor controller 140. Accordingly, as a distance between the sensor controller 140 and the electrodes 120 increases, a length of the sensing wires may also 130 increases.

In this case, the longer sensing wires 130 may include resistive elements 135 and 137 having a longer length thereof. For example, a length L1 of the resistance element 135 formed on a first sensing wire which is one of the sensing wires 130 may be longer than a length L2 of the resistance element 137 formed on a second sensing wire having a length shorter than that of the first sensing wire.

The resistance elements 135 and 137 may be formed separately from the sensing wires 130, and then electrically connected to the sensing wires 130, but the present invention is not limited thereto. For example, the aforementioned resistance elements 135 and 137 may be formed by extending the sensing wires 130 as portions of the sensing wires 130.

Figure 6:
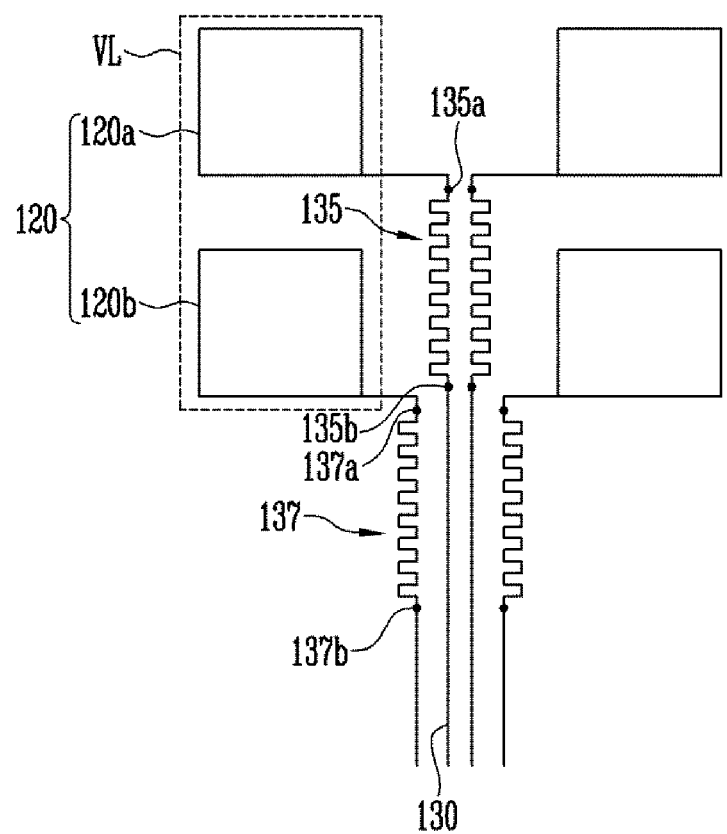
FIG. 6 is an enlarged view of a portion of the touch sensor shown in FIG. 1, illustrating a shape of sensing wires according to another exemplary embodiment of the present invention.

FIG. 6 is an enlarged view of a portion of the touch sensor shown in FIG. 1, illustrating a shape of sensing wires according to another exemplary embodiment of the present invention. For better comprehension and ease of description, sensing wires connected with four electrodes and the electrodes are illustrated in FIG. 6.

Referring to FIG. 6, the sensing wires 130 may be respectively connected to the electrodes 120.

The sensing wires 130 according to the present exemplary embodiment may include resistive elements 135 and 137 formed in a zigzag pattern. As a result, the sensing wires 130 including the resistive elements 135 and 137 of the zigzag pattern may operate as a strain gauge.

Specifically, when a touch is inputted on the touch sensor 100, a position of the touch may be obtained through the amount of change of the self capacitance of the electrodes 120 related to the touch, and a magnitude of the touch pressure may be obtained from a strain of the resistance elements 135 and 137.

Referring to FIG. 6, the resistance elements 135 and 137 may be respectively formed between first points 135a and 137a and second points 135b and 137b of the sensing wires 130.

For example, the first points 135a and 137a and the second points 135b and 137b may be opposite ends of the resistance elements 135 and 137, respectively.

The resistance elements 135 and 137 connected with electrodes 120a and 120b arranged in a same vertical line VL may be sequentially formed in a second direction (Y-axis direction).

For example, the first point 137a of a sense wire connected with a $(i+1)^{th}$ electrode 120b may be positioned at a height (Y-axis coordinates) that is identical or similar to that of the second point 135b of a sensing wire connected with an $i^{th}$ electrode 120a of the electrodes (i being a natural number).

As a result, a first area at which the resistance element 135 connected with the $i^{th}$ electrode 120a is formed and a second area at which the resistance element 137 connected with the $(i+1)^{th}$ electrode 120b may be arranged in the second direction (Y-axis direction).

In this case, lengths of the resistance elements 135 and 137 may be the same.

In FIG. 5 and FIG. 6, it is illustrated that the resistance elements 135 and 137 have the zigzag pattern, but the present invention is not limited thereto. For example, when the resistance elements 135 and 137 may operate as a strain gauge, the pattern of the resistance elements 135 and 137 may be variously changed.

Additionally, it is illustrated in FIG. 5 and FIG. 6 that the resistance elements are included in all the sensing wires, but the present invention is not limited thereto. For example, the resistance elements may be included in some of the sensing wires included in the touch sensor.

Figure 7:
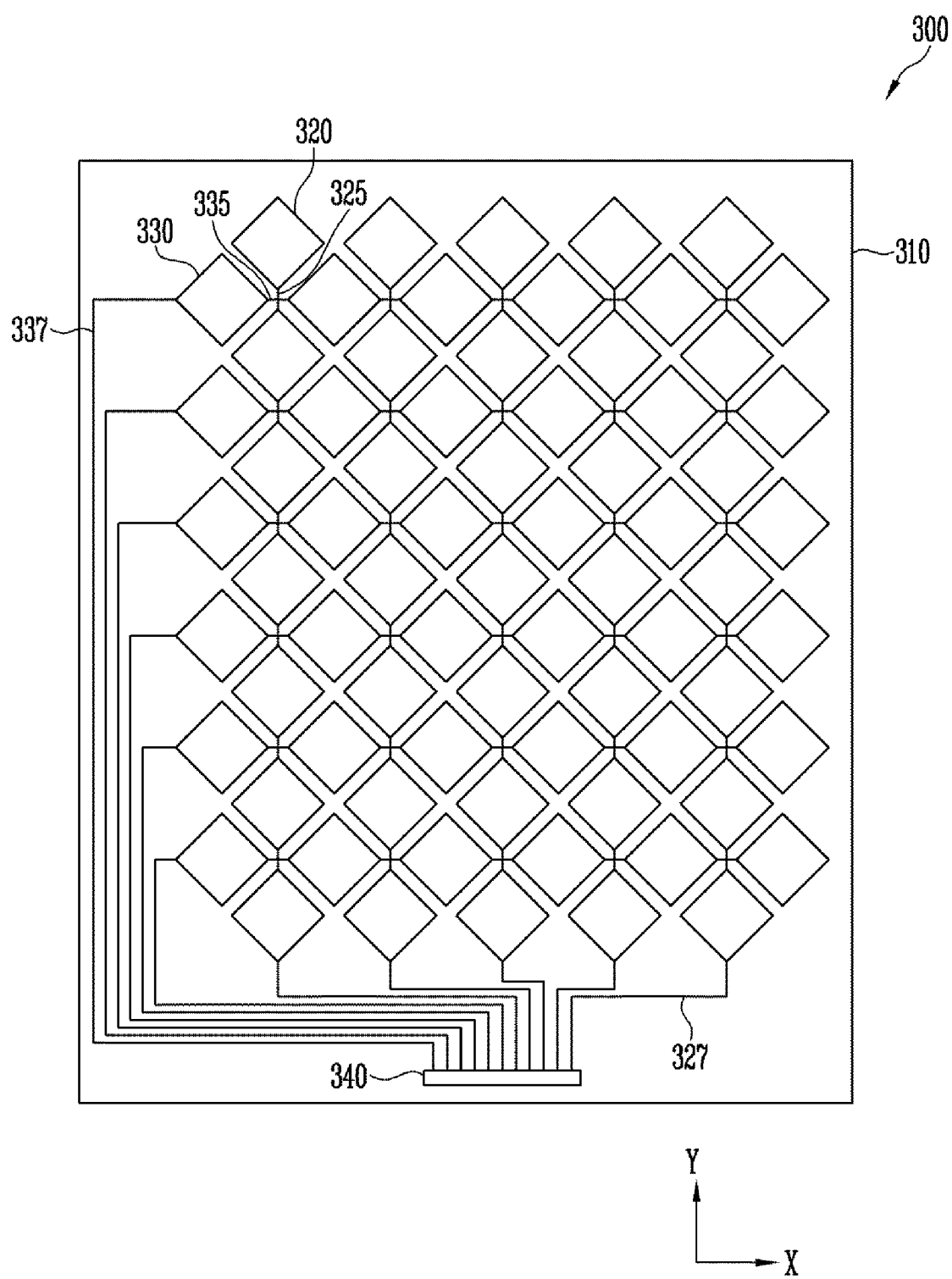
FIG. 7 illustrates a touch sensor according to another exemplary embodiment of the present invention.

FIG. 7 illustrates a touch sensor according to another exemplary embodiment of the present invention.

Referring to FIG. 7, a touch sensor 300 according to another exemplary embodiment of the present invention may include a substrate 310, a plurality of first electrodes 320, a plurality of second electrodes 330, a plurality of wires 327 and 337, and a sensor controller 340.

Since a structure of the substrate 310 and a material constituting the substrate 310 has been described with reference to FIG. 1, the detailed description related to the substrate 310 will be omitted hereinafter.

The first electrodes 320 and the second electrodes 330 may be disposed on the substrate 310.

The electrodes 320 and 330 may have a rhombus shape or a diamond shape, and the rhombus or diamond shape electrodes 320 and 330 may extend in the first direction (X axis direction) or the second direction (Y axis direction).

The first electrodes 320 may be electrically connected to each other along the second direction (Y-axis direction) through the first connector 325, and the second electrodes 330 may be electrically connected to each other along the first direction (X-axis direction) through the second connector 335.

The first electrodes 320 and the second electrodes 330 may be disposed on different layers or may be disposed on a same layer.

Regions between the first electrodes 320 may be filled with the second electrodes 330, and when the first electrodes 320 and the second electrodes 330 are disposed at a same layer, a predetermined insulating material may be formed at an intersection between a first connector 325 and a second connector 335 (a bridge structure) in order to electrically separate the first electrodes 320 and the second electrodes 330.

According to another exemplary embodiment of the present invention, the electrodes 320 and 330 may serve to sense a touch inputted into the touch sensor 300 by utilizing an amount of change in electrostatic capacitance, and particularly, may serve to sense mutual-capacitance.

Specifically, mutual electrostatic capacitance between the first electrodes 320 and the second electrodes 330 may be formed by disposal of the first electrodes 320 and the second electrodes 330, and when a touch is inputted into the touch sensor 300, mutual capacitance between the electrodes 320 and 330 associated with the touch may change.

The first electrodes 320 and the second electrodes 330 may be formed of a same material as the electrodes 120 described with reference to FIG. 1.

A shape of the electrodes 320 and 330 may be variously changed without being limited to the shape illustrated in FIG. 7.

The first wires 327 may be connected to the first electrodes 320 and the sensor controller 340. In addition, the second wires 337 may be connected to the second electrodes 330 and the sensor controller 340. The wires 327 and 337 may serve to transfer signals outputted from the electrodes 320 and 330, to the sensor controller 340.

The first electrode 320 may receive a driving signal from the sensor controller 340, and the second electrode 330 may output a sensing signal reflecting the change in capacitance to the sensor controller 340.

Accordingly, the sensor controller 340 may detect a touch position by using a signal outputted from the second electrode 330.

Figure 8:
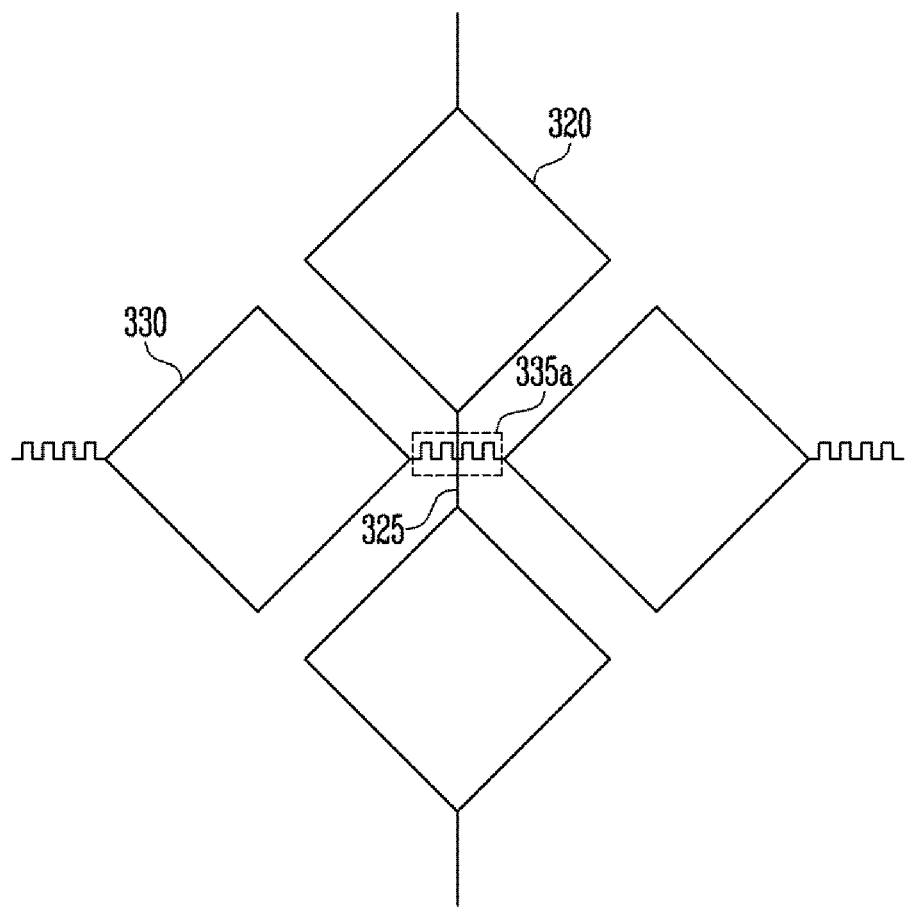
FIG. 8 is an enlarged view of a portion of the touch sensor shown in FIG. 7, illustrating a shape of a connector according to an exemplary embodiment of the present invention.

FIG. 8 is an enlarged view of a portion of the touch sensor shown in FIG. 7, illustrating a shape of a connector according to an exemplary embodiment of the present invention. For better comprehension and ease of description, FIG. 8 also illustrates an area at which two first electrodes 320 and two second electrodes 330 are formed.

Referring to FIG. 8, a second connector 335a for connecting the second electrodes 330 with each other may include a resistance element formed in a zigzag pattern.

As illustrated in FIG. 8, in the case that the second connector 335a includes the resistance element of the zigzag pattern, when a pressure having a predetermined magnitude is inputted on the touch sensor 300, a length or a cross-sectional area of the second connector 335a may be changed.

Since the resistance value may change when the length or cross-sectional area of the second connector 335a changes, the magnitude of the pressure may be determined from the changed resistance value.

As a result, according to the present exemplary embodiment, the second connector 335a may operate as a strain gauge. The second connector 335a may simultaneously perform a function of electrically connecting the second electrodes 330 and a function of a pressure sensor.

Specifically, when a touch is inputted on the touch sensor 300, a position of the touch may be obtained through the amount of change of the self capacitance of the electrodes 320 and 330, and a magnitude of the touch pressure may be obtained from a strain of the resistance elements 135 and 137.

A resistance element of the second connector 335a may be formed of a same material as the resistance elements 135 and 137 described above.

An electrical signal corresponding to the mutual capacitance change amount and the electrical signal corresponding to the strain of the second connector 335a may be transmitted to the sensor control unit 340 through the wires 327 and 337. The sensor controller 340 may calculate a position of the touch and a magnitude of the pressure using the electrical signals.

Referring to FIG. 8, all illustrated second connectors 335a include resistance elements, but the present invention is not limited thereto. For example, some of the second connectors 335a may include resistance elements.

Figure 9:
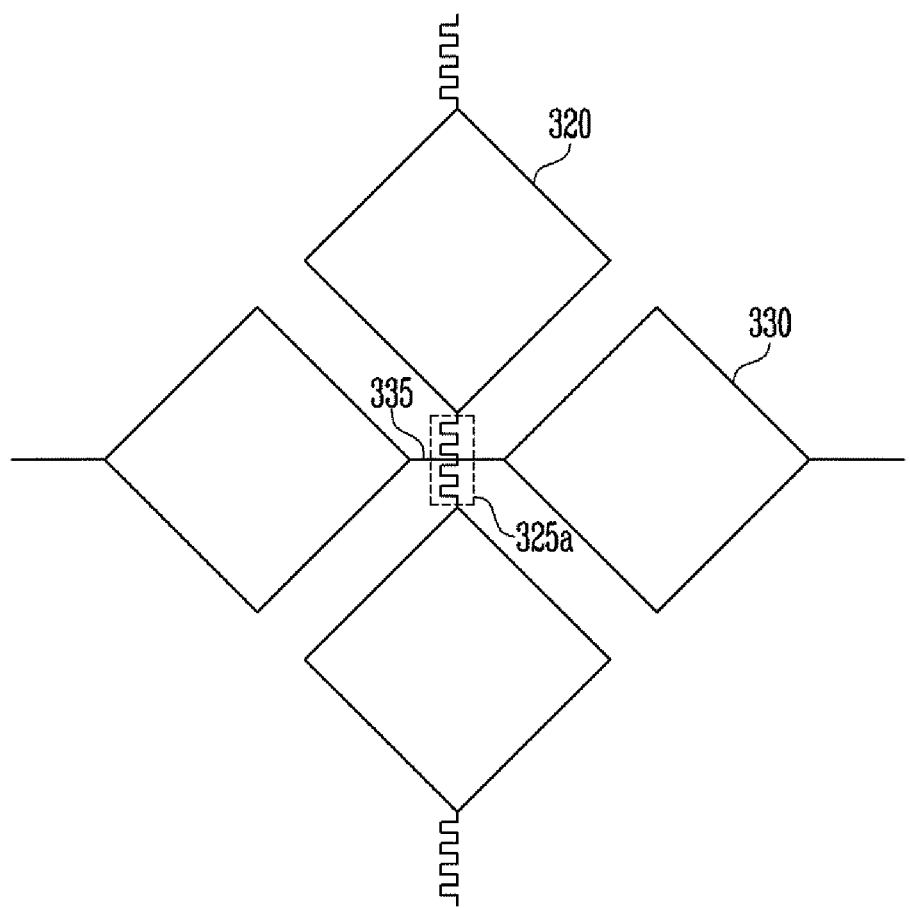
FIG. 9 is an enlarged view of a portion of the touch sensor shown in FIG. 7, illustrating a shape of a connector according to another exemplary embodiment of the present invention.

FIG. 9 is an enlarged view of a portion of the touch sensor shown in FIG. 7, illustrating a shape of a connector according to another exemplary embodiment of the present invention. For better comprehension and ease of description, FIG. 9 also illustrates an area at which two first electrodes 320 and two second electrodes 330 are formed.

Referring to FIG. 9, a first connector 325a for connecting the first electrodes 320 with each other may include a resistance element formed in a zigzag pattern.

In the case that the first connector 325a includes the resistance element of the zigzag pattern, when a pressure having a predetermined magnitude is inputted on the touch sensor 300, a length or a cross-sectional area of the first connector 325a may be changed.

Since the resistance value may change when the length or cross-sectional area of the first connector 325a changes, the magnitude of the pressure may be determined from the changed resistance value.

As a result, the first connector 325a may operate as a strain gauge. The first connector 325a may simultaneously perform a function of electrically connecting the first electrodes 320 and a function of a pressure sensor.

Specifically, when a touch is inputted on the touch sensor 300, a position of the touch may be obtained through the amount of change of the self capacitance of the electrodes 320 and 330, and a magnitude of the touch pressure may be obtained from a strain of the first connector 325a.

An electrical signal corresponding to the mutual capacitance change amount and the electrical signal corresponding to the strain of the first connector 325a may be transmitted to the sensor control unit 340 through the wires 327 and 337. The sensor controller 340 may calculate a position of the touch and a magnitude of the pressure using the electrical signals.

Referring to FIG. 9, all illustrated first connectors 325a include resistance elements, but the present invention is not limited thereto. For example, some of the first connectors 325a may include resistance elements.

Figure 10:
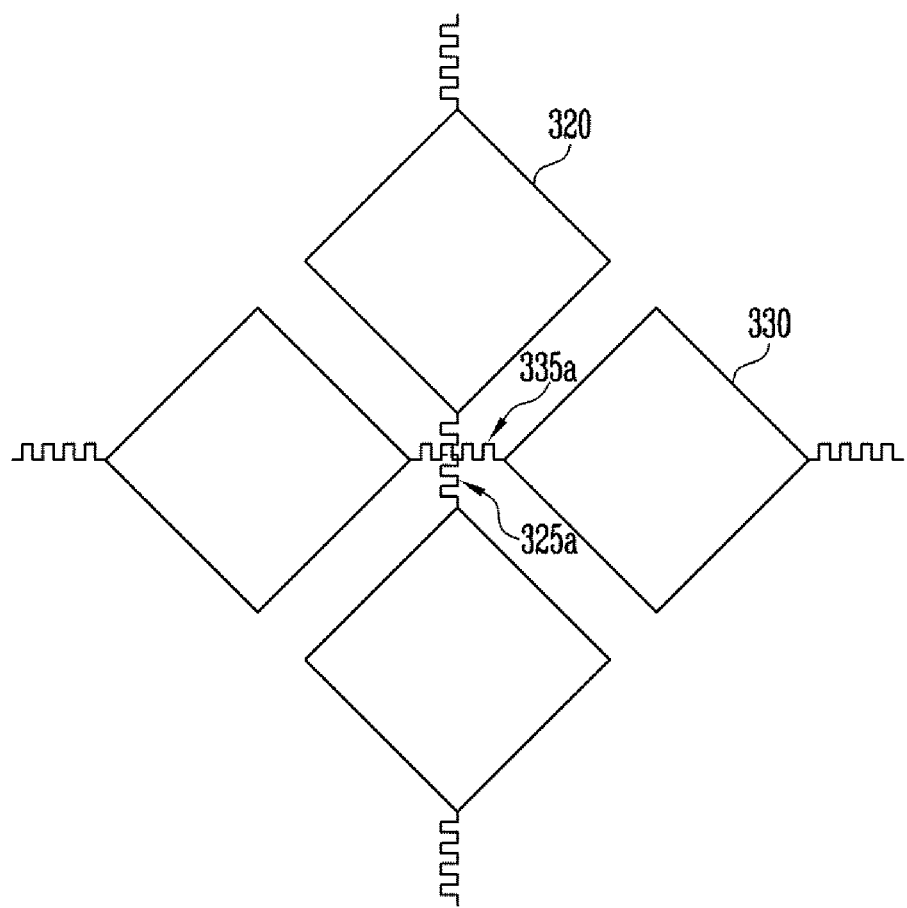
FIG. 10 is an enlarged view of a portion of the touch sensor shown in FIG. 7, illustrating a shape of a connector according to yet another exemplary embodiment of the present invention.

FIG. 10 is an enlarged view of a portion of the touch sensor shown in FIG. 7, illustrating a shape of a connector according to yet another exemplary embodiment of the present invention. For better comprehension and ease of description, FIG. 10 also illustrates an area at which two first electrodes 320 and two second electrodes 330 are formed.

Referring to FIG. 10, a first connector 325a for connecting the first electrodes 320 with each other a second connector 335a for connecting the second electrodes 330 with each other may include a resistance element formed in a zigzag pattern.

As illustrated with reference to FIG. 8 and FIG. 9, the first connector 325a and the second connector 335a operate as a strain gauge. Accordingly, the first connector 325a and the second connector 335a may respectively perform a function of electrically connecting the first electrodes 320 and the second electrodes 330 and a function of a pressure sensor.

Since details of acquiring a position of the touch and a magnitude of the pressure by using the electrodes 320 and 330 and the connector 325a and 335a according to the exemplary embodiments of the present invention have already been described, a description thereof will be omitted hereinafter.

Meanwhile, in FIG. 8 to FIG. 10, it is illustrated that the resistance element included in the first connector 325a or second connector 335a has the zigzag pattern, but the present invention is not limited thereto. For example, when the resistance element can operates as a strain gauge, the pattern of the resistance element may be variously changed.

Referring to FIG. 10, all illustrated first connectors 325a and second connectors 335a include resistance elements, but the present invention is not limited thereto. For example, some of the first connectors 325a and some of the second connectors 335a may include resistance elements.

Figure 11:
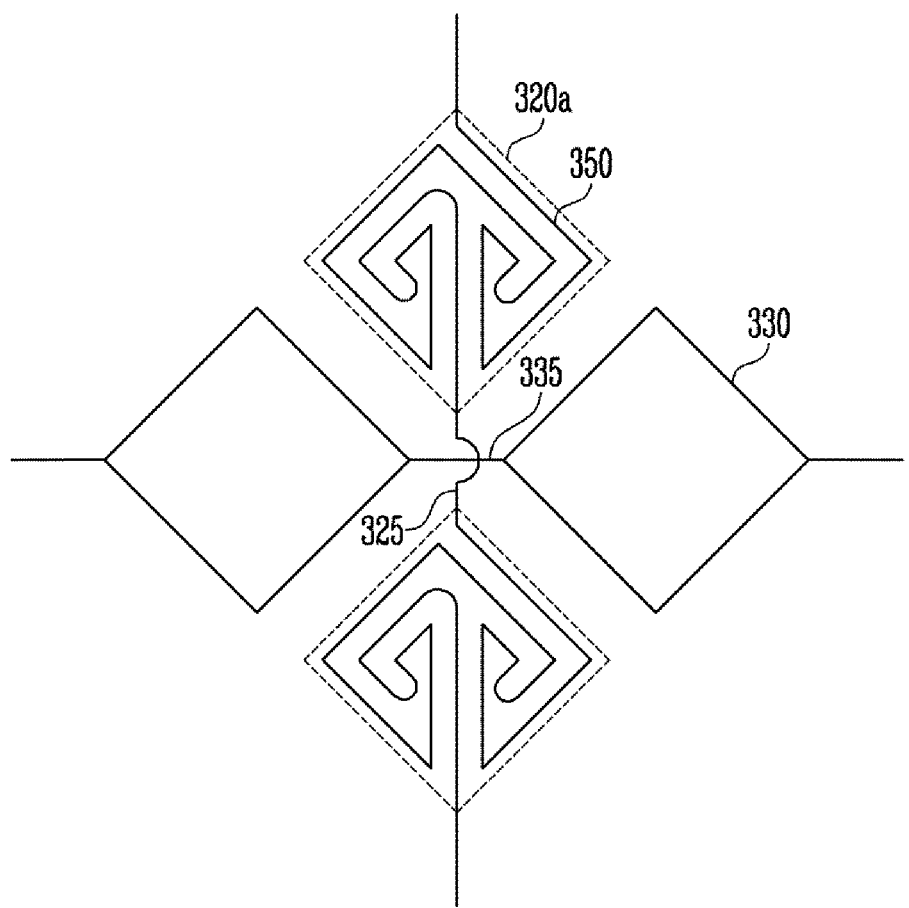
FIG. 11, FIG. 12, and FIG. 13 are enlarged views of a portion of the touch sensor shown in FIG. 7, illustrating a shape of an electrode according to various exemplary embodiments of the present invention.
Figure 12:
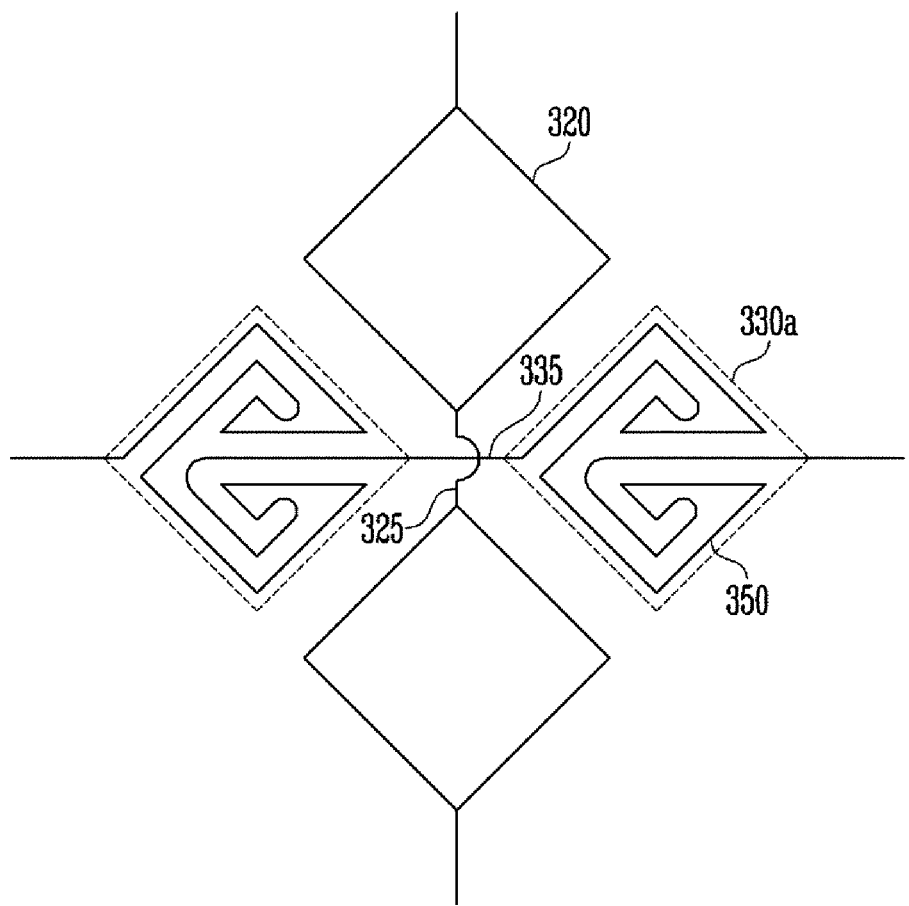
Figure 13:
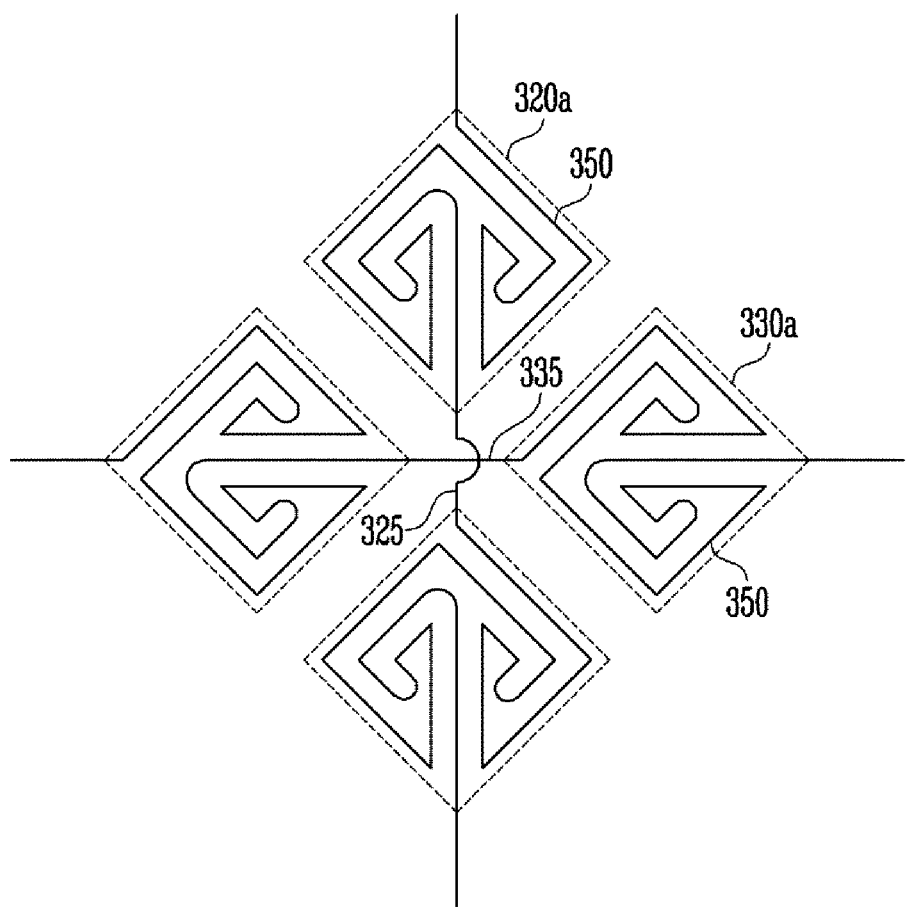

FIG. 11 to FIG. 13 are enlarged views of a portion of the touch sensor shown in FIG. 7, illustrating a shape of an electrode according to various exemplary embodiments of the present invention.

For better comprehension and ease of description, FIG. 11 to FIG. 13 also illustrate an area at which two first electrodes and two second electrodes are formed Referring to FIG. 11, the first electrode 320a according to the present exemplary embodiment includes a resistance element 350, and the resistance element 350 may be bent to have a predetermined pattern within a unit electrode region.

In the case that the first electrodes 320a includes the resistance element 350 having the bent shape to have the predetermined pattern, when a pressure having a predetermined magnitude is inputted on the touch sensor 300, a length or a cross-sectional area of the resistance element 350 may be changed.

Since the resistance value may change when the length or cross-sectional area of the resistance element 350 changes, the magnitude of the pressure may be determined from the changed resistance value.

As a result, according to the present exemplary embodiment, the first electrode 320a may operate as a strain gauge.

Specifically, when a touch is inputted on the touch sensor 300, a position of the touch may be obtained through the amount of change of the self capacitance of the electrodes 320a and 330, and a magnitude of the touch pressure may be obtained from a strain of the first electrode 320a.

The resistance element 350 included in the first electrode 320a may be formed of a same material as the resistance elements 150, 151, and 152 described above.

Next, referring to FIG. 12, the second electrode 330a according to the present exemplary embodiment may include a resistance element 350, and the resistance element 350 may be bent to have a predetermined pattern within a unit electrode region.

As a result, the second electrodes 330a may operate as a strain gauge like the aforementioned first electrodes 320a.

Specifically, when a touch is inputted on the touch sensor 300, a position of the touch may be obtained through the amount of change of the self capacitance of the electrodes 320 and 330a, and a magnitude of the touch pressure may be obtained from a strain of the second electrode 330a.

The resistance element 350 of the second electrode 320a may be formed of a same material as the resistance elements 150, 151, 152, and 350 described above.

Referring to FIG. 13, the first electrode 320a and the second electrode 330a according to the present exemplary embodiment includes a resistance element 350, and the resistance element 350 may be bent to have a predetermined pattern in a unit electrode region.

As a result, both of the first electrodes 320a and the second electrodes 330a may operate as a strain gauge.

Specifically, the first electrode 320a and the second electrode 330a may simultaneously perform a function of sensing an amount of change of the mutual capacitance and a function of a strain gauge.

Accordingly, when a touch is inputted on the touch sensor 300, a position of the touch may be obtained through the amount of change of the self capacitance of the electrodes 320a and 330a, and a magnitude of the touch pressure may be obtained from a strain of the resistance elements 350.

An electrical signal corresponding to the mutual capacitance change amount and the electrical signal corresponding to the strain of the resistance element 350 may be transmitted to the sensor control unit 340 through the wires 327 and 337

The sensor controller 340 may calculate a position of the touch and a magnitude of the pressure using the electrical signals.

A pattern of the resistance element 350 included in the first electrodes 320a or the second electrodes 330a according to the present exemplary embodiment is not limited to those illustrated in FIG. 11 to FIG. 13. For example, when the resistance element 350 can operate as a strain gauge, the pattern of the resistance element may be variously changed.

Figure 14:
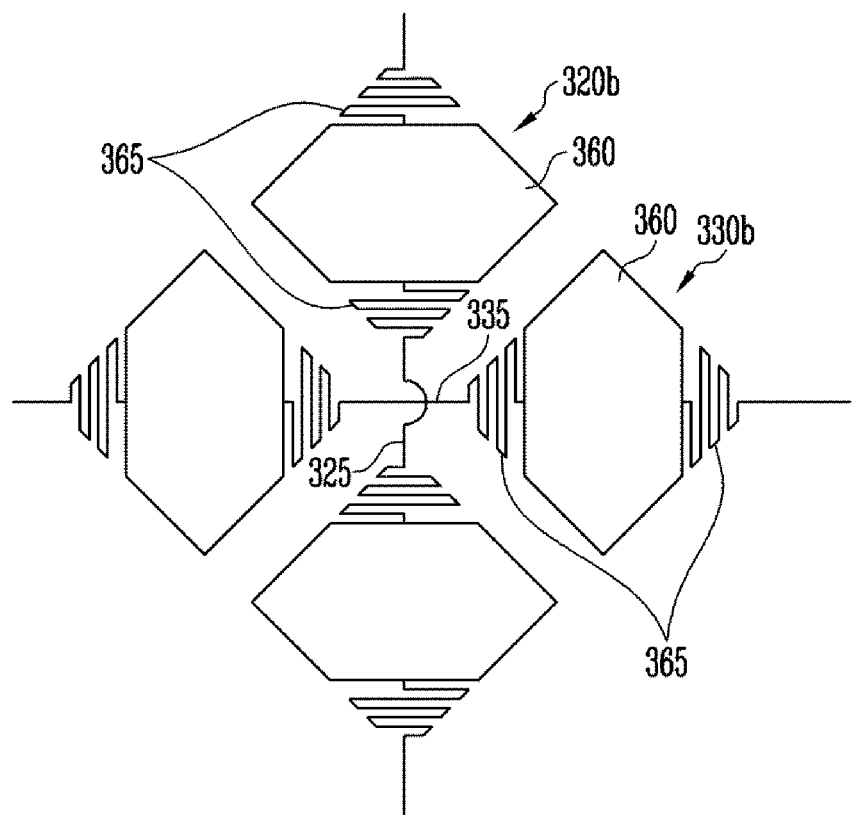
FIG. 14 and FIG. 15 are enlarged views of a portion of the touch sensor shown in FIG. 7, illustrating a shape of an electrode according to another exemplary embodiment of the present invention.
Figure 15:
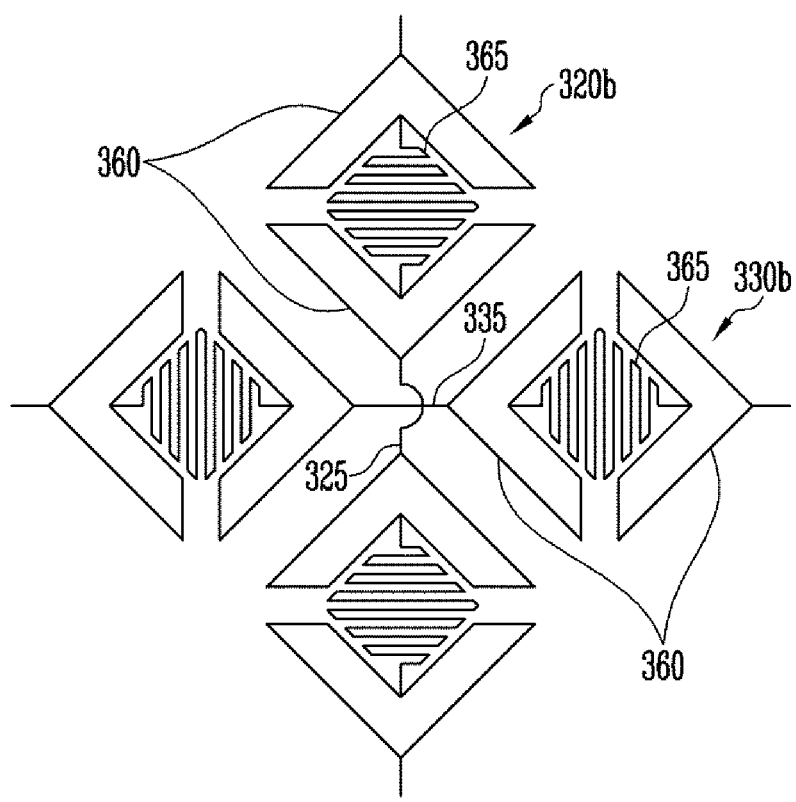

FIG. 14 and FIG. 15 are enlarged views of a portion of the touch sensor shown in FIG. 7, illustrating a shape of an electrode according to another exemplary embodiment of the present invention.

Referring to FIG. 14, a first electrode 320b and a second electrode 330b may include a first sub-electrode 360 and a pair of second sub-electrodes 365.

The first sub-electrode 360 may have a polygonal shape patterned with a conductive material, and may be formed of a same material as the electrodes 120 described with reference to FIG. 1.

The first sub-electrodes 360 included in the respective electrodes 320b and 330b may be disposed adjacent to each other. Specifically, one side of the first sub-electrode 360 of the first electrodes 320b may face one side of the first sub-electrodes 360 of the second electrodes 330b, adjacent to the first electrodes 320b.

Although the first sub-electrode 360 is illustrated as having a hexagonal shape in FIG. 14, the present invention is not limited thereto, and the shape of the first sub-electrode 360 may be variously modified.

The second sub-electrode 365 may include a resistance element that is electrically connected to the first sub-electrode 360, and is bent in a zigzag shape.

The resistance element included in the second sub-electrode 365 may be formed of a same material as the resistance elements 150 and 350 described above.

In the case that each of the electrodes 320b and 330b includes a resistance element, when a pressure having a predetermined magnitude is inputted on the touch sensor 300, a length or a cross-sectional area of the resistance element may be changed.

Since the resistance value may change when the length or cross-sectional area of the resistance element changes, the magnitude of the pressure may be determined from the changed resistance value.

As a result, the second sub-electrodes 365 included in the respective electrodes 320b and 330b may operate as a strain gauge.

Accordingly, when a touch is inputted, a position of the touch may be obtained through mutual capacitance change amounts of the electrodes 320b and 330b related to the touch, and the magnitude of a pressure of the touch may be obtained from a strain of the second sub electrode 365.

Referring to FIG. 15, the first electrode 320b and the second electrode 330b may include a pair of first sub-electrodes 360 and a second sub-electrode 365.

The first sub-electrode 360 may have a polygonal shape, and may have a V-shape in particular.

The first sub-electrodes 360 included in the respective electrodes 320b and 330b may be disposed adjacent to each other. Specifically, one side of the first sub-electrode 360 of the first electrodes 320b may face one side of the first sub-electrodes 360 of the second electrodes 330b, adjacent to the first electrodes 320b.

The second sub-electrode 365 may be disposed between the pair of first sub-electrodes 360 to electrically connect the pair of first sub-electrodes 360 separated from each other. Further, the second sub-electrode 365 may include a resistance element bent in a zigzag shape.

In the case that each of the electrodes 320b and 330b includes a resistance element, when a pressure having a predetermined magnitude is inputted on the touch sensor 300, a length or a cross-sectional area of the resistance element may be changed.

Since the resistance value may change when the length or cross-sectional area of the resistance element changes, the magnitude of the pressure may be determined from the changed resistance value.

As a result, the second sub-electrodes 365 included in the respective electrodes 320b and 330b may operate as a strain gauge. Accordingly, when a touch is inputted, a position of the touch may be obtained through mutual capacitance change amounts of the electrodes 320b and 330b related to the touch, and the magnitude of a pressure of the touch may be obtained from a strain of the second sub electrode 365.

When a part of each of the electrodes 320b and 330b has a polygonal shape as shown in FIG. 14 and FIG. 15, the magnitude of mutual capacitance may be larger than the electrodes shown in FIG. 11 to FIG. 13. Thus, sensitivity of touch detection may be improved.

Shapes of the first sub-electrode 360 and the second sub-electrode 365 may be variously modified in addition to those shown in FIG. 14 and FIG. 15

Figure 16:
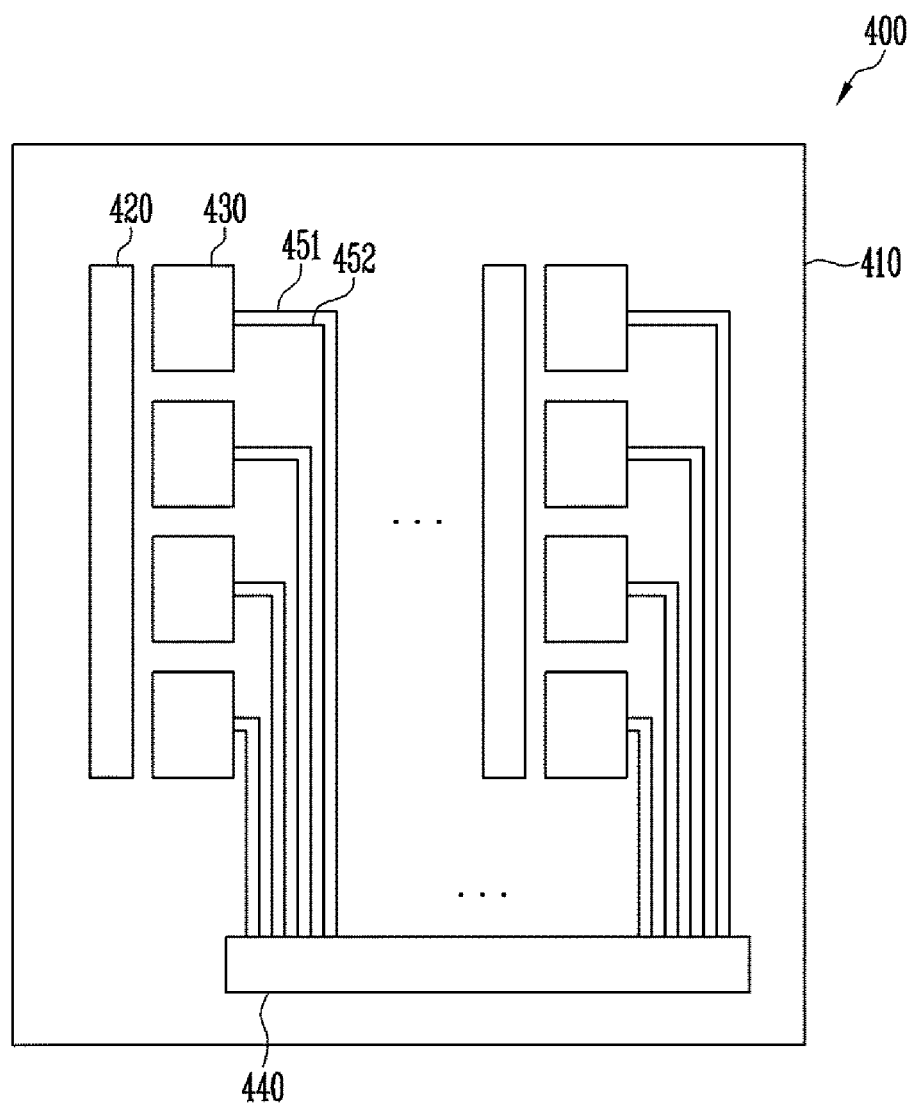
FIG. 16 illustrates a touch sensor according to yet another exemplary embodiment of the present invention.

FIG. 16 illustrates a touch sensor according to yet another exemplary embodiment of the present invention.

Referring to FIG. 16, the touch sensor 400 according to yet another exemplary embodiment of the present invention may include a substrate 410, a plurality of first electrodes 420, a plurality of second electrodes 430, a plurality of sensing wires 451 and 452, and a sensor controller 440.

The substrate 410 may be formed in the same shape as the substrates 110 and 310 shown in FIG. 1 and FIG. 7, to perform the same function. Therefore, a detailed description of the substrate 410 will be omitted.

The first electrodes 420 and the second electrodes 430 may be disposed on the substrate 410, and may be disposed on a same layer The first electrodes 420 may serve as a driving electrode, and the second electrodes 430 may serve as a sensing electrode. As a result, the sensor control unit 440 may apply a driving signal to the first electrodes 420 and receive a signal including information related to the capacitance from the second electrodes 430.

The first electrodes 420 may have a bar shape that extends in the second direction (Y-axis direction), and may be arranged in the first direction (X-axis direction).

Although not illustrated in FIG. 16, a wire for receiving a driving signal may be connected to the first electrodes 420.

The second electrodes 430 may be arranged along the second direction (Y-axis direction) between the first electrodes 420. When a driving signal is applied to the first electrodes 420, a mutual capacitance may be formed between the adjacent second electrodes 430.

The sensing wires 451 and 452 may be connected to the second electrodes 430. Specifically, the sensing wires 451 and 452 may extend from the corresponding second electrode 430, and may be electrically connected to the sensor controller 440.

The sensing wires 451 and 452 may perform a function of transmitting a signal outputted from the second electrode 430, to the sensor controller 440. The signal may include information related to a capacitance change amount and a signal corresponding to a strain of a resistance element to be described later.

When a touch is inputted into the touch sensor 400, since a mutual electrostatic capacitance between the first electrodes 420 and the second electrodes 430 related to the touch may change, the sensor control unit 440 may detect a position of the touch by using a signal outputted from the second electrodes 430.

Although the second electrodes 430 and the sensing wires 451 and 452 may be formed on a same layer in FIG. 16, the present invention is not limited thereto. For example, the second electrodes 430 and the sensing wires 451 and 452 may be formed at different layers, or may be electrically connected through contact holes.

Figure 17:
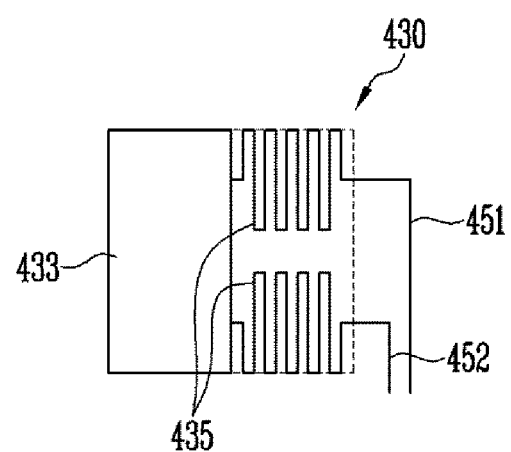
FIG. 17 is a detailed view illustrating a second electrode shown in FIG. 16.

FIG. 17 is a detailed view illustrating a second electrode shown in FIG. 16.

Referring to FIG. 17, the second electrode 430 may include a first sub-electrode 433 and a second sub-electrode 435.

The first sub-electrode 433 may have a rectangular shape, and may be positioned adjacent to the first electrode 420. For example, the first sub-electrode 433 may be disposed between the first electrode 420 and the second sub-electrode 435 forming mutual capacitance.

The first sub-electrode 433 may be formed of a same material as the electrodes 120 described above with reference to FIG. 1.

The second sub-electrode 435 may include a resistance element electrically connected to the first sub-electrode 433 and connected to the first sensing wire 451 and a resistance element connected to the second sensing wire 452. The resistance elements may have a zigzag shape, and may be formed of a same material as the resistance element 150 described above.

In the case that the second electrode 430 includes a resistance element, when a pressure having a predetermined value is inputted on the touch sensor 400, the length or the cross-sectional area of the resistance element may change.

Since the resistance value may change when the length or cross-sectional area of the resistance element changes, the magnitude of the pressure may be determined from the changed resistance value. As a result, the second sub-electrode 435 included in the second electrode 430 may operate as a strain gauge.

Accordingly, when a touch is inputted, a position of the touch may be obtained through mutual capacitance change amounts of the electrodes 420 and 430 related to the touch, and the magnitude of a pressure of the touch may be obtained from a strain of the second sub-electrode 435.

In this case, a first mutual-capacitance between the second sub-electrode 435 and the first electrodes 420 may be smaller than a second mutual-capacitance between the first sub-electrode 433 and the first electrodes 420.

Meanwhile, it is illustrated in FIG. 17 that the first sub-electrode 433 has a quadrangular shape, but the present invention is not limited thereto. For example, the shape of the first sub-electrode 433 may be variously modified.

In addition, the shape of the second sub-electrode 435 is not limited to the shape shown in FIG. 17.

According to the exemplary embodiments of the present invention, it is possible to provide a touch sensor for detecting a pressure of a touch.

According to the exemplary embodiments of the present invention, it is possible to provide a touch sensor for detecting a touched point and a touch pressure.

According to the exemplary embodiments of the present invention, it is possible to reduce a thickness of a touch sensor for detecting a touched point and a touch pressure.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor, comprising:
a plurality of first electrodes;
a plurality of sensing wires connected to the first electrodes and extending in a first direction; and
a plurality of second electrodes disposed on a same layer as the first electrodes and configured to form mutual-capacitance together with the first electrodes,
wherein each of the first electrodes comprises a resistance element having a shape that is at least partially bent in a first portion of a unit electrode region and a resistance value that changes in response to a pressure of a touch,
each of the first electrodes comprises a first sub-electrode having a polygonal shape in a second portion of the unit electrode region disposed adjacent at least one of the second electrodes to form mutual-capacitance, and a second sub-electrode connected with the first sub-electrode and having the resistance element, and
the second portion of the unit electrode region has a greater area in plan view than the first portion of the unit electrode region.

2. The touch sensor of claim 1, wherein a portion of the resistance element has a spiral shape.

3. The touch sensor of claim 1, wherein a portion of the resistance element has a zigzag shape.

4. The touch sensor of claim 1, wherein the resistance element operates as a strain gauge.

5. The touch sensor of claim 1, wherein the pressure of the touch is detected from the changed resistance value of the resistance element, and
a position of the touch is detected from a capacitance change of the first electrodes.

6. The touch sensor of claim 1, wherein the first sub-electrode is disposed closer to the second electrode than the second sub-electrode.

7. The touch sensor of claim 1, wherein the second sub-electrode is disposed between the first sub-electrode and the sensing wires.

8. A touch sensor, comprising:
a plurality of first electrodes arranged in a first direction;
a plurality of second electrodes disposed on a same layer as the first electrodes and arranged in a second direction that is perpendicular to the first direction, to form mutual-capacitance together with an adjacent first electrode;
a plurality of first connectors configured to connect the first electrodes; and
a plurality of second connectors configured to connect the second electrodes,
wherein both of the first and second electrodes comprise a resistance element having a zigzag pattern, and each of the first and second electrodes comprises:
a first sub-electrode having a polygonal shape disposed in a first portion of a unit electrode region to form mutual-capacitance with a first sub-electrode of an adjacent second or first electrode;
a second sub-electrode disposed in a second portion of the unit electrode region and having the resistance element, and
the first portion of the unit electrode region has a greater area in plan view than the second portion of the unit electrode region.

9. The touch sensor of claim 8, wherein one side of a first sub-electrode of the first electrode faces one side of first sub-electrodes of second electrodes adjacent to the first electrode.

10. A touch sensor of a display device, comprising:
a plurality of first electrodes;
a plurality of sensing wires connected to the first electrodes and extending in a first direction; and
a plurality of second electrodes disposed on a same layer as the first electrodes and configured to form mutual-capacitance together with the first electrodes,
wherein each of the first electrodes comprises a resistance element having a shape that is at least partially bent in a first portion of a unit electrode region and a resistance value that changes in response to a pressure of a touch, and
each of the first electrodes comprises a first sub-electrode having a polygonal shape in a second portion of the unit electrode region disposed adjacent at least one of the second electrodes to form mutual-capacitance and a second sub-electrode having the resistance element.

* * * * *